: US011639053B2

United States Patent
Veregin et al.

(10) Patent No.: US 11,639,053 B2
(45) Date of Patent: *May 2, 2023

(54) PROCESS FOR PREPARING A THREE-DIMENSIONAL PRINTING COMPOSITION

(71) Applicant: Xerox Corporation, Norwalk, CT (US)

(72) Inventors: Richard P. N. Veregin, Mississauga (CA); Karen A. Moffat, Brantford (CA); Michael Steven Hawkins, Cambridge (CA); Shivanthi Easwari Sriskandha, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 719 days.

This patent is subject to a terminal disclaimer.

(21) Appl. No.: 16/369,359

(22) Filed: Mar. 29, 2019

(65) Prior Publication Data

US 2020/0307027 A1    Oct. 1, 2020

(51) Int. Cl.
| | | |
|---|---|---|
| *B29B 7/90* | (2006.01) | |
| *B33Y 10/00* | (2015.01) | |
| *B33Y 70/00* | (2020.01) | |
| *B29C 64/153* | (2017.01) | |
| *B29B 13/06* | (2006.01) | |
| *C09D 11/102* | (2014.01) | |

(52) U.S. Cl.
CPC ............. *B29B 7/90* (2013.01); *B29B 13/065* (2013.01); *B29C 64/153* (2017.08); *B33Y 10/00* (2014.12); *B33Y 70/00* (2014.12); *C09D 11/102* (2013.01)

(58) Field of Classification Search
CPC .......... B29B 7/90; B33Y 10/00; B29C 64/209
See application file for complete search history.

(56) References Cited

U.S. PATENT DOCUMENTS

| | | |
|---|---|---|
| 3,590,000 A | 6/1971 | Palermiti et al. |
| 3,681,106 A | 8/1972 | Burns et al. |
| 3,847,604 A | 11/1974 | Bach et al. |

(Continued)

FOREIGN PATENT DOCUMENTS

| | | | |
|---|---|---|---|
| EP | 1 510 318 A1 | | 3/2005 |
| JP | 2003055468 A | * | 2/2003 |
| WO | WO 2018/148359 | | 8/2018 |

OTHER PUBLICATIONS

Extended European Search Report issued in European Application No. 20165359.9-1103, dated Aug. 31, 2020.

(Continued)

*Primary Examiner* — Timothy Kennedy
*Assistant Examiner* — Farah Taufiq
(74) *Attorney, Agent, or Firm* — Marylou J. Lavoie, Esq. LLC

(57) ABSTRACT

A process including providing a three-dimensional printing powder dispersion comprising a three-dimensional printing powder, an optional dispersing agent, and water; providing an emulsion of an organic polymeric additive; combining the three-dimensional printing powder dispersion and the emulsion of organic polymeric additive to form a mixture comprising the three-dimensional printing powder dispersion and the emulsion of organic polymeric additive; and drying the mixture of the three-dimensional printing powder dispersion and the emulsion of organic polymeric additive.

18 Claims, 2 Drawing Sheets

(56) References Cited

U.S. PATENT DOCUMENTS

| | | | |
|---|---|---|---|
| 4,298,672 A | 11/1981 | Lu | |
| 4,338,390 A | 7/1982 | Lu | |
| 4,533,614 A | 8/1985 | Fukumoto et al. | |
| 4,845,006 A | 7/1989 | Matsubara et al. | |
| 4,863,824 A | 9/1989 | Uchida et al. | |
| 4,863,825 A | 9/1989 | Yoshimoto et al. | |
| 4,917,983 A | 4/1990 | Uchida et al. | |
| 4,931,370 A | 6/1990 | Amaya | |
| 4,933,252 A | 6/1990 | Nishikawa et al. | |
| 4,935,326 A | 6/1990 | Creatura et al. | |
| 4,937,166 A | 6/1990 | Creatura et al. | |
| 4,957,774 A | 9/1990 | Doi et al. | |
| 4,973,539 A | 11/1990 | Sacripante et al. | |
| 4,980,448 A | 12/1990 | Tajiri et al. | |
| 4,981,939 A | 1/1991 | Matsumura et al. | |
| 4,988,794 A | 1/1991 | Kubo et al. | |
| 5,057,596 A | 10/1991 | Kubo et al. | |
| 5,077,170 A | 12/1991 | Tsujihiro | |
| 5,143,809 A | 9/1992 | Kaneko et al. | |
| 5,227,460 A | 7/1993 | Mahabadi et al. | |
| 5,236,629 A | 8/1993 | Mahabadi et al. | |
| 5,290,654 A | 3/1994 | Sacripante et al. | |
| 5,302,486 A | 4/1994 | Patel et al. | |
| 5,330,874 A | 7/1994 | Mahabadi et al. | |
| 5,376,494 A | 12/1994 | Mahabadi et al. | |
| 5,480,756 A | 1/1996 | Mahabadi et al. | |
| 5,500,324 A | 3/1996 | Mahabadi et al. | |
| 5,601,960 A | 2/1997 | Mahabadi et al. | |
| 5,629,121 A | 5/1997 | Nakayama | |
| 5,650,484 A | 7/1997 | Hawkins et al. | |
| 5,750,909 A | 5/1998 | Hawkins et al. | |
| 6,048,954 A * | 4/2000 | Barlow | C08F 220/12 |
| | | | 526/329.7 |
| 6,063,827 A | 5/2000 | Sacripante et al. | |
| 6,120,967 A | 9/2000 | Hopper et al. | |
| 6,214,507 B1 | 4/2001 | Sokol et al. | |
| 6,326,119 B1 | 12/2001 | Hollenbaugh, Jr. et al. | |
| 6,358,657 B1 | 3/2002 | Silence et al. | |
| 6,359,105 B1 | 3/2002 | Ianni et al. | |
| 6,592,913 B2 | 7/2003 | Cook et al. | |
| 6,593,053 B1 | 7/2003 | Chang et al. | |
| 7,329,476 B2 | 2/2008 | Sacripante et al. | |
| 8,663,886 B2 * | 3/2014 | Vanbesien | G03G 9/0823 |
| | | | 430/108.7 |
| 2002/0072005 A1 * | 6/2002 | Kohtaki | G03G 9/08702 |
| | | | 430/108.1 |
| 2006/0063085 A1 | 3/2006 | Lee et al. | |
| 2006/0216626 A1 | 9/2006 | Sacripante et al. | |
| 2007/0202426 A1 | 8/2007 | Kikushima | |
| 2008/0107990 A1 | 5/2008 | Field et al. | |
| 2008/0236446 A1 | 10/2008 | Zhou et al. | |
| 2008/0241724 A1 * | 10/2008 | Mcdougall | G03G 9/09725 |
| | | | 430/108.3 |
| 2009/0047593 A1 | 2/2009 | Mizutani et al. | |
| 2012/0156605 A1 * | 6/2012 | Vanbesien | G03G 9/09708 |
| | | | 430/108.2 |
| 2015/0024316 A1 * | 1/2015 | Orrock | B29C 64/153 |
| | | | 430/108.3 |
| 2017/0075241 A1 * | 3/2017 | Basfar | G03G 9/0904 |
| 2017/0252974 A1 | 9/2017 | Ng et al. | |
| 2017/0361531 A1 * | 12/2017 | Hasskerl | C09D 133/12 |
| 2018/0009975 A1 * | 1/2018 | Farrugia | C08F 212/08 |
| 2018/0022043 A1 * | 1/2018 | Keoshkerian | B33Y 70/00 |
| | | | 264/497 |
| 2019/0086826 A1 * | 3/2019 | Komada | G03G 9/08711 |
| 2020/0199352 A1 * | 6/2020 | Masuda | C08G 59/4021 |
| 2020/0398338 A1 * | 12/2020 | Kasperchik | B33Y 70/10 |
| 2021/0340294 A1 * | 11/2021 | Gledmacher | C08J 3/124 |

OTHER PUBLICATIONS

Blumel et al., "Increasing flowability and bulk density of PE-HD powders by a dry particle coating process and impact on LBM processes," Rapid Prototyping Journal, vol. 21, No. 6, 2015, 607-704.

Ralph L. Carr, Jr., Evaluating Flow Properties of Solids, Chem. Eng. 1965, 72, 163-168.

C. H. Ji et al., "Sintering Study of 316L stainless steel metal injection molding parts using Taguchi method: final destiny," Materials Science and Engineering, A311, 2001, 74-82.

Yan et al., "Influence of particle size on property of Ti-6A1-4V alloy prepared by high-velocity compaction," Transactions of Nonferrous Metals Society of China, 23, 2013, 361-365.

Dick Herzog et al. "Additive Manufacturing of Metals," Acta Materialia, 117, 2016, 371-392.

Richard P. N. Veregin, et al., U.S. Appl. No. 16/369,126, filed Mar. 29, 2019, "Toner Compositions and Processes Having Reduced or No Titania Surface Additives," not yet published.

Richard P. N. Veregin, et al., U.S. Appl. No. 16/369,206, filed Mar. 29, 2019, "Cross-Linked Polymeric Latex Prepared With A Low Surface Tension Surfactant," not yet published.

Richard P. N. Veregin, et al., U.S. Appl. No. 16/369,013, filed Mar. 29, 2019, "Toner Compositions and Processes Including Polymeric Toner Additives," not yet published.

Richard P. N. Veregin, et al., U.S. Appl. No. 16/369,278, filed Mar. 29, 2019, "Surface Additive for Three-Dimensional Polymeric Printing Powders," not yet published.

Richard P. N. Veregin, et al., U.S. Appl. No. 16/369,449, filed Mar. 29, 2019, "Surface Additive for Three-Dimensional Metal Printing Compositions," not yet published.

Richard P. N. Veregin, et al., U.S. Appl. No. 15/914,411, filed Mar. 7, 2018, "Toner Compositions and Surface Polymeric Additives," not yet published.

Shirin Alexander, et al., "Low-Surface Energy Surfactants With Branched Hydrocarbon Architectures," Langmuir, 2014, 30, 3413-3421.

Richard J. Farn, Editor, Chemistry and Technology of Surfactants, Blackwell Publishing, 2006.

Suzanna Lauren, "Surface and Interfacial Tension—What Is It and How To Measure It?," White Paper, Biolin Scientific, Ver. 2017-06.

Christian Cavallo, "All About Selective Laser Melting 3D Printing," https://www.thomasnet.com/articles/custom-manufacturing-fabricating/selective-laser-melting-3d-printing/, modified Jun. 17, 2022.

Leon Huang, "What Is Selective Laser Sintering (SLS) 3D Printing?," https://www.rapiddirect.com/blog/selective-laser-sintering/, Mar. 18, 2022.

\* cited by examiner

PROCESS FOR PREPARING A THREE-DIMENSIONAL PRINTING COMPOSITION

RELATED APPLICATIONS

Commonly assigned U.S. Publication No. 2020-0308328, entitled "Toner Compositions And Processes Including Polymer Toner Additives"), filed concurrently herewith, which is hereby incorporated by reference herein in its entirety, describes a polymeric composition including a copolymer comprising a first monomer having a high carbon to oxygen ratio of from about 3 to about 8; a second monomer comprising two or more vinyl groups, wherein the second monomer is present in the copolymer in an amount of from greater than about 8 percent by weight to about 60 percent by weight, based on the weight of the copolymer; and a third monomer comprising an amine, wherein the third monomer is present in an amount of from about 0.5 percent by weight to about 5 percent by weight, based on the weight of the copolymer. A toner including the copolymer as a toner surface additive. An emulsion aggregation toner process including the copolymer as a toner surface additive.

Commonly assigned U.S. Pat. No. 11,150,568, entitled "Toner Compositions And Processes Having Reduced Or No Titania Surface Additives"), filed concurrently herewith, which is hereby incorporated by reference herein in its entirety, describes a toner including toner particles comprising at least one resin, in combination with an optional colorant, and an optional wax; and a copolymer toner additive on at least a portion of an external surface of the toner particles, the copolymer toner additive comprising a first monomer having a high carbon to oxygen ratio of from about 3 to about 8; and a second monomer comprising two or more vinyl groups, wherein the second monomer is present in the copolymer in an amount of from greater than about 8 percent by weight to about 60 percent by weight, based on the weight of the copolymer; wherein the copolymer toner additive has a volume average particle diameter of from about 20 nanometers to less than about 70 nanometers.

Commonly assigned U.S. Pat. No. 10,725,394, entitled "Cross-Linked Polymeric Latex Prepared With A Low Surface Tension Surfactant"), filed concurrently herewith, which is hereby incorporated by reference herein in its entirety, describes a polymeric composition including a copolymer comprising a first monomer having a high carbon to oxygen ratio of from about 3 to about 8; a second monomer comprising two or more vinyl groups, wherein the second monomer is present in the copolymer in an amount of from greater than about 8 percent by weight to about 40 percent by weight, based on the weight of the copolymer; and optionally, a third monomer comprising an amine, wherein the third monomer is present in an amount of from about 0.1 percent by weight to about 1.5 percent by weight, based on the weight of the copolymer; and a surfactant, wherein the surfactant has a minimum surface tension at critical micelle concentration of less than about 30 mN/m. A toner including the copolymer as a toner surface additive. An emulsion aggregation toner process including the copolymer as a toner surface additive.

Commonly assigned U.S. Pat. No. 11,001,662, entitled "Surface Additive For Three-Dimensional Printing Polymeric Powders"), filed concurrently herewith, which is hereby incorporated by reference herein in its entirety, describes a composition including a three-dimensional polymeric printing powder; an organic polymeric additive on at least a portion of an external surface of the three-dimensional polymeric printing powder; and optionally, an inorganic additive on at least a portion of an external surface of the three-dimensional polymeric printing powder. A process for preparing a three-dimensional polymeric printing powder having an organic polymeric additive disposed thereon. A process for employing the three-dimensional polymeric printing powder including selective laser sintering.

Commonly assigned U.S. Publication No. 2020-0306830, entitled "Surface Additive For Three-Dimensional Metal Printing Compositions"), filed concurrently herewith, which is hereby incorporated by reference herein in its entirety, describes a composition including a three-dimensional metal printing powder; an organic polymeric additive on at least a portion of an external surface of the three-dimensional metal printing powder; and optionally, an inorganic additive on at least a portion of an external surface of the three-dimensional metal printing powder. A process for preparing a three-dimensional metal printing powder having an organic polymeric additive disposed thereon. A process for employing the three-dimensional metal printing powder including selective laser sintering.

BACKGROUND

Disclosed herein is a process comprising providing a three-dimensional printing powder dispersion comprising a three-dimensional printing powder, an optional dispersing agent, and water; providing an emulsion of an organic polymeric additive; combining the three-dimensional printing powder dispersion and the emulsion of organic polymeric additive to form a mixture comprising the three-dimensional printing powder dispersion and the emulsion of organic polymeric additive; and drying the mixture of the three-dimensional printing powder dispersion and the emulsion of organic polymeric additive.

Selective Laser Sintering (SLS) is one of the most popular additive manufacturing processes that creates a three-dimensional (3D) object layer-by-layer. The process applies layers of powder material on top of each other sequentially, where each layer of powder is sintered or coalesced together with a laser according to the computer aided drawing (CAD) geometry of the part.

SLS is a powder bed based additive manufacturing technique to produce complex three-dimensional parts. In SLS, a rasterized laser is used to scan over a bed of polymer powder, sintering it to form solid shapes in a layer-wise fashion. When the laser beam scans the powder, the powder melts due to the rising temperature, and layer by layer, the final part approaches full density and should result in properties of the bulk material (that is, the polymer). In theory, every thermoplastic polymer that can be transformed into a powder form can be processed via this technique, but the reality is that every material behaves differently, often unpredictably, during melting, coalescence, and consolidation, and often requires unique SLS processing parameters. The bed temperature and laser energy input, for example, can be selected based on the processing window of the polymer's thermal profile as well as its energy absorption. Laser parameters can also be selected based on the powder's particle size and shape.

U.S. Patent Publication 2018/0022043, which is hereby incorporated by reference herein in its entirety, describes in the Abstract thereof a method of selective laser sintering. The method comprises providing composite particles made by emulsion aggregation, the composite particles comprising at least one thermoplastic polymer and at least one carbon particle material. The composite particles are exposed to a laser to fuse the composite particles.

There are different types of polymer particles that are generally used in the SLS process. Semi-crystalline resins such as polyamides including PA12, PA11, and PA6, polylactic acid (PLA), polyether ether ketone (PEEK), polyethylene (PE), polypropylene (PP), and others are used. The most common polymer powder employed is polyamide PA12. The common name for polyamide is nylon. For example polyamide PA12 is also known as nylon 12, polyamide PA6 is also known as nylon 6. A layer-upon-layer structure is formed by sintering the polymer particles together with a laser above the melting point of the polymer according to the CAD geometry file of the part.

In 3D applications using particulate powders there are a number of problems that can occur due to inter-particle interactions within the powder. These potential problems include adverse effects on particulate flow, which enables the powder to flow within the 3D printer and in the powder bed or in the delivery nozzle, as well as how tightly the powders pack together for the sintering step. High inter-particle forces lead to poor flow, which can limit the speed at which powder is supplied, or can cause the particles to clog up the delivery system. High inter-particle forces can mean that the particles do not pack well, which can lead to large pores and poor sintering, leaving a weak, irregularly shaped, rough surface and porous final part. Finally, the powder from a bed can be reused. For polymeric powders, the recycling can result in the particles sticking together due to proximate heating as the part is formed. After one or more recycling steps the particle flow can be degraded, and particles may also start to stick together in clumps, leading to a greater tendency to slow or clog the delivery system, or to form non-uniform, porous and weak parts.

Nanoparticulate silica powders have been used as additives in 3D printing applications for improving flow. See Blümel et al., Rapid Proto. J. 21 (2015) 697-704: "Increasing flowability and bulk density of PE-HD powders by a dry particle coating process. And further, that this can have a large impact on Laser Beam Melting (LBM) processes" of the powder, and thus the quality of the final part, in particular improving the porosity and density of the part, and thus the part's overall strength ( )." However, as pointed out in the article, the silica chemistry is not necessarily a good match with the chemistry of the 3D powder, and thus is not necessarily effective. Further silica is refractory, so it melts at a very high temperature, thus it will not flow in the sintering steps for a 3D polymeric powder, which may interfere with proper sintering.

While currently available SLS materials, including three-dimensional printing powders, may be suitable for their intended purposes, there remains a need for improved three-dimensional printing powders. Further, a need remains for additives that can provide improved flow and blocking of three-dimensional printing powders. Further, a need remains for additives that enable recycling of the three-dimensional powder. Further, a need remains for additives that enable three-dimensional printing of high density and strong parts. Further, a need remains for improved processes for preparing three-dimensional printing compositions including for processes that are more cost effective than previously available processes.

The appropriate components and process aspects of the each of the foregoing U. S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a process comprising providing a three-dimensional printing powder dispersion comprising a three-dimensional printing powder, an optional dispersing agent, and water; providing an emulsion of an organic polymeric additive; combining the three-dimensional printing powder dispersion and the emulsion of organic polymeric additive to form a mixture comprising the three-dimensional printing powder dispersion and the emulsion of organic polymeric additive; and drying the mixture of the three-dimensional printing powder dispersion and the emulsion of organic polymeric additive to provide a three-dimensional printing composition.

DETAILED DESCRIPTION

Figures 1, 2:
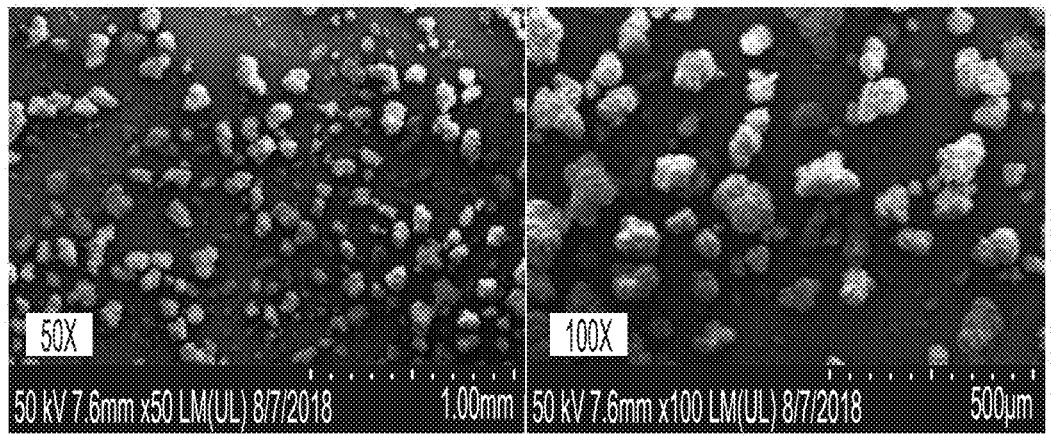
FIG. 1 shows a scanning electron micrograph of PA12 polyamide particles at 50× magnification.
FIG. 2 shows a scanning electron micrograph of PA12 polyamide particles at 100× magnification.

A polymeric surface additive prepared by emulsion polymerization to be used with, or instead of a silica or other inorganic additive, on the surface of a three-dimensional (3D) polymeric powder, is provided. The polymeric surface additive improves the flow or blocking performance of the 3D powder, and thus improves the density and strength of the produced parts. There are a number of potential advantages for an organic additive compared to an inorganic additive such as silica. First, the organic chemistry of the monomers can be selected to be compatible with that of the 3D powder for effective blending. This can be done by changing the matrix polymer of the polymeric latex or by changing the amount of a co-monomer that has either acid or basic functionality. Thus, the hydrophobicity and the acid-base chemistry can be tuned as required. The organic latex additive can be crosslinked or non-crosslinked. The crosslinked additive is more robust to aggressive handling, as, to be effective, the additive must stay as a spherical particle on the 3D particle surface. If the particle flattens, then it will no longer be functional as a surface additive. However, under most conditions in 3D printing, such robustness may not be required, in which case a non-crosslinked organic polymeric latex as described herein is selected as the surface additive. The advantage of the non-crosslinked organic polymeric latex is that it can be formulated to melt in the sintering process, and thus be less likely to interfere with the proper sintering of parts.

For blocking performance, it is also desirable to recycle the 3D powder. Powder that has been in close proximity to the heating source in the sintering process may clump together due to some melting. On recycling, these clumps may not readily break up, such that they are sufficiently blocked that they are effectively stuck together. When this material is recycled, this can lead to poor 3D powder flow. In embodiments herein, the organic polymeric latex additive is used as a surface additive to improve blocking.

A process for preparing a three-dimensional printing composition herein includes adding an emulsion polymerized polymeric surface additive as an aqueous dispersion to the surface of a 3D polymeric powder, to improve the flow or blocking performance of the 3D powder, and thus improve the density and strength of the produced parts. Optionally, an inorganic surface additive can be provided as an aqueous dispersion to the surface of the 3D polymeric powder. Optionally, an inorganic surface additive, such as silica is added in a subsequent dry blending step.

Advantageously, the process herein comprising adding the polymerized latex surface additive in an aqueous dispersion is that no drying of the additive is required, which reduces cycle time as well as eliminating the drying cost, which can provide a major cost reduction. Further, if the 3D printing powder is produced by an aqueous chemical process, then the polymerized latex can be added at the end of that aqueous process. If the 3D powder is produced in solvent, or by grinding or jetting, then it may be necessary to add some surfactant to the 3D powder to re-disperse it with the polymeric latex.

In embodiments, the organic polymeric additives herein comprise a monomer selected from the group consisting of an acrylate monomer, a methacrylate monomer, and combinations thereof. The organic polymeric surface additives herein can employ as the matrix monomer of the polymeric composition cyclohexyl methacrylate (CHMA), which is a hydrophobic monomer which can mimic the hydrophobicity of silane treated silica. To this can be added a monomer composition of divinyl benzene (DVB), which creates a highly cross-linked structure, to create a hard particle that will remain as a spherical particle with aggressive handling. The cross-linker can be left out of the formulation if cross-linking is not required or desired. An optional third monomer of the polymeric composition can be dimethyaminoethyl methacrylate (DMAEMA). The cross-linker is optional for applications directed to 3D particles, but potentially would be a good match to a polyamide particle, for example, due to the nitrogen group, which would interact strongly with the amide groups. Alternately, CHMA organic additive latex can be prepared with acid functionality, using β-CEA or acrylic acid. The acid group would interact strongly with the amide groups in polyamide, due to an acid-base. Alternately, for high density polyethylene, it may be desirable not to have a functional group, and have just the hydrophobic CHMA monomer, which would be relatively compatible. Compared to a comparable size silica, the organic additive requires less additive to effectively cover the surface compared to a silica, as the organic polymer latex density is typically less than 1.4 g/cm$^3$, while silica is 2.2 g/cm$^3$, and other inorganic additives are even higher, and so require proportionally higher loading.

As used herein, a polymer or co-polymer is defined by the monomer(s) from which a polymer is made. Thus, for example, while in a polymer made using an acrylate monomer as a monomer reagent, an acrylate moiety per se no longer exists because of the polymerization reaction, as used herein, that polymer is said to comprise the acrylate monomer. Thus, an organic polymeric additive made by a process disclosed herein can be prepared, for example, by the polymerization of monomers including cyclohexyl methacrylate, divinyl benzene, and dimethylaminoethyl methacrylate. The resulting organic polymeric additive can be said to comprise cyclohexyl methacrylate as that monomer was used to make the organic polymeric additive; can be said to be composed of or as comprising divinyl benzene as divinyl benzene is a monomer reagent of that polymer; and so on. Hence, a polymer is defined herein based on one or more of the component monomer reagents, which provides a means to name the organic polymeric additives herein.

In embodiments, an organic polymeric additive is provided comprising a polymer or copolymer comprising a first monomer having a high carbon to oxygen ratio of from about 3 to about 8; an optional second monomer comprising two or more vinyl groups, wherein the second monomer, if present, can be present in the copolymer in an amount of from greater than about 8 percent by weight to about 40 percent by weight, based on the weight of the copolymer; and optionally, a third monomer comprising an amine, wherein the third monomer, if present, is present in an amount of from about 0.1 percent by weight to about 1.5 percent by weight, or in an amount of from about 0.5 percent by weight to about 1.5 percent by weight, based on the weight of the copolymer. In embodiments, the organic polymer additive further comprises a surfactant. In certain embodiments, the surfactant has a minimum surface tension of less than about 45 mN/m.

The organic polymeric surface additive, also termed herein an organic polymeric additive or a polymer or copolymer organic additive, in embodiments, is a latex formed using emulsion polymerization. The latex includes at least one monomer with a high carbon to oxygen (C/O) ratio optionally combined with a monomer possessing two or more vinyl groups, optionally combined with a monomer containing an amine functionality. The aqueous latex can then be dried and can be used in place of, or in conjunction with, other toner additives. The use of a high C/O ratio monomer provides good relative humidity (RH) stability, and the use of the amine functional monomer may provide desirable adhesion of the organic polymer additive to the surface of the 3D particles. The DMAEMA is optional for applications directed to 3D particles, but potentially would be a good match to a polyamide particle, for example, due to the nitrogen group, which would interact strongly with the amide groups, resulting in good attachment of the polymeric additive to the polyamide particle surface. Alternately, CHMA organic additive latex can be prepared with acid functionality, using β-CEA or acrylic acid. The acid group would interact strongly with the amide groups in polyamide, due to an acid-base interaction, again effectively attaching the polymer additive to the polyamide particle surface. Alternately, for high density polyethylene, it could be desirable not to have a functional group, and have just the hydrophobic CHMA monomer, which would be relatively compatible. The use of a monomer possessing two or more vinyl groups, sometimes referred to herein, in embodiments, as a crosslinking monomer or a crosslinking vinyl monomer, provides a crosslinked property to the polymer, thereby providing mechanical robustness.

In embodiments, the organic additive comprises at least one non-cross-linkable polymerizable monomer; or the organic additive comprises at least one cross-linkable polymerizable monomer; or the organic additive comprises a combination of at least one non-cross-linkable polymerizable monomer and at least one cross-linkable polymerizable monomer.

In certain embodiments, the organic polymeric additive is free of cross-linkable polymerizable monomers.

The resulting organic polymer or copolymer additive may be used as an additive with three-dimensional printing compositions, providing the resulting three-dimensional printing compositions with desired characteristics including improved flow and blocking as well as the ability to prepare high density and strong parts. The polymeric additives herein may be used at a lower density compared with other additives, so that much less material by weight is required for equivalent surface area coverage, compared to inorganic additives, including oxides such as titania and silica. The polymeric additives of the present disclosure may also provide the three-dimensional printing powders with a wide range of properties including robustness, desired melting properties, among other properties, depending on the monomers used in the formation of the organic polymers or copolymers.

As noted above, the organic polymeric or copolymeric additive may be in a latex. In embodiments, a latex polymer or copolymer utilized as the organic polymeric surface additive may include a first monomer having a high C/O ratio, such as an acrylate or a methacrylate. The C/O ratio of such a monomer may be from about 3 to about 8, in embodiments, from about 4 to about 7, or from about 5 to about 6. In embodiments, the monomer having a high C/O ratio may be an aliphatic cycloacrylate. Suitable aliphatic cycloacrylates which may be utilized in forming the polymer additive include, for example, cyclohexyl methacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornyl methacrylate, isobornyl acrylate, benzyl methacrylate, phenyl methacrylate, combinations thereof, and the like.

The first monomer having a high carbon to oxygen ratio, in embodiments, a cycloacrylate, may be present in the polymer or copolymer utilized as an organic polymeric additive in any suitable or desired amount. In embodiments, the cycloacrylate may be present in the polymer or copolymer in an amount of from about 40 percent by weight of the copolymer to about 99.4 percent by weight of the copolymer, or from about 50 percent by weight of the copolymer to about 95 percent by weight of the copolymer, or from about 60 percent by weight of the copolymer to about 95 percent by weight of the copolymer. In embodiments, the first monomer is present in the copolymer in an amount of from about 40 percent by weight to about 90 percent by weight, based on the weight of the copolymer, or from about 45 percent by weight to about 90 percent by weight, based on the weight of the copolymer.

The organic polymer or copolymer additive optionally includes a second monomer, wherein the second monomer comprises a crosslinking monomer. In embodiments, the second monomer comprises a crosslinking monomer possessing vinyl groups, in certain embodiments, two or more vinyl groups.

Suitable monomers having vinyl groups for use as the crosslinking vinyl containing monomer include, for example, diethyleneglycol diacrylate, triethyleneglycol diacrylate, tetraethyleneglycol diacrylate, polyethyleneglycol diacrylate, 1,6-hexanediol diacrylate, neopentylglycol diacrylate, tripropyleneglycol diacrylate, polypropyleneglycol diacrylate, 2,2'-bis(4-(acryloxy/diethoxy)phenyl)propane, trimethylolpropane triacrylate, tetramethylolmethane tetraacrylate, ethyleneglycol dimethacrylate, diethyleneglycol dimethacrylate, triethyleneglycol dimethacrylate, tetraethyleneglycol dimethacrylate, polyethyleneglycol dimethacrylate, 1,3-butyleneglycol dimethacrylate, 1,6-hexanediol dimethacrylate, neopentylglycol dimethacrylate, polypropyleneglycol dimethacrylate, 2,2',-bis(4-(methacryloxy/diethoxy)phenyl)propane, 2,2'-bis(4-(methacryloxy/polyethoxy)phenyl)propane, trimethylolpropane trimethacrylate, tetramethylolmethane tetramethacrylate, divinyl benzene, divinyl naphthalene, divinyl ether, combinations thereof, and the like. In a specific embodiment, the cross-linking monomer is divinyl benzene.

The organic polymer or copolymer additive herein optionally comprises a second monomer which results in the organic additive being a highly crosslinked copolymer. In embodiments, the second monomer comprising two or more vinyl groups is present in the copolymer in an amount of greater than about 8 percent by weight to about 60 percent by weight, based upon the weight of the copolymer, or greater than about 10 percent by weight to about 60 percent by weight, based upon the weight of the copolymer, or greater than about 20 percent by weight to about 60 percent by weight, based upon the weight of the copolymer, or greater than about 30 percent by weight to about 60 percent by weight, based upon the weight of the copolymer. In certain embodiments, the second monomer is present in the copolymer in an amount of greater than about 40 percent by weight to about 60 percent by weight, or greater than about 45 percent by weight to about 60 percent by weight, based on the weight of the copolymer.

In embodiments, the organic polymeric additive comprises a cross-linkable monomer containing 2 or more vinyl groups; and the cross-linkable monomer containing 2 or more vinyl groups is present in the organic polymeric additive in an amount of greater than zero up to about 40 percent, by weight, based on the total weight of the organic polymeric additive.

In an alternate embodiment, as mentioned above, the organic polymer or copolymer additive does not contain a crosslinking monomer.

The organic polymer or copolymer additive herein optionally further comprises a third monomer comprising an amine functionality. Monomers possessing an amine functionality may be derived from acrylates, methacrylates, combinations thereof, and the like. In embodiments, suitable amine-functional monomers include dimethylaminoethyl methacrylate (DMAEMA), diethylaminoethyl methacrylate, dipropylaminoethyl methacrylate, diisopropylaminoethyl methacrylate, dibutylaminoethyl methacrylate, combinations thereof, and the like.

In embodiments, the organic copolymer additive herein does not contain the third monomer. In other embodiments, the organic copolymer additive herein contains the third monomer comprising an amine-functional monomer. The amine-functional monomer, if present, may be present in the organic copolymer in an amount of from about 0.1 percent by weight of the copolymer to about 40 percent by weight of the copolymer, or from about 0.5 percent by weight of the copolymer to about 5 percent by weight of the copolymer, or from about 0.5 percent by weight of the copolymer to about 1.5 percent by weight of the copolymer.

In embodiments, the organic copolymer additive comprises an acidic monomer, a basic monomer, or a combination thereof. In certain embodiments, the organic polymeric additive comprises a basic monomer having a nitrogen-containing group; and the basic monomer having a nitrogen-containing group is present in the organic polymeric additive in an amount of less than about 1.5 percent, by weight, based on the total weight of the organic polymeric additive. In other embodiments, the organic polymeric additive comprises an acidic monomer having an acidic group selected from the group consisting of acrylic acid, beta-carboxyethyl acrylate, and combinations thereof; and the acidic monomer is present in the organic polymeric additive in an amount of less than about 4 percent, by weight, based on the total weight of the organic polymeric additive.

In embodiments, the organic copolymer additive comprises cyclohexyl methacrylate as a hydrophobic monomer and divinyl benzene as a cross-linkable monomer. In certain embodiments, the copolymer additive comprises cyclohexyl methacrylate as a hydrophobic monomer, divinyl benzene as a cross-linkable monomer, and dimethylaminoethyl methacrylate as a nitrogen-containing monomer. In other embodiments, the copolymer additive is free of the cross-linkable monomer.

Methods for forming the organic polymer or copolymer surface additive are within the purview of those skilled in the art and include, in embodiments, emulsion polymerization of the monomers utilized to form the polymeric additive.

In the polymerization process, the reactants may be added to a suitable reactor, such as a mixing vessel. The appropriate amount of starting materials may be optionally dissolved in a solvent, an optional initiator may be added to the solution, and contacted with at least one surfactant to form an emulsion. A copolymer may be formed in the emulsion (latex), which may then be recovered and used as the polymeric additive for a three-dimensional printing composition.

Where utilized, suitable solvents include, but are not limited to, water and/or organic solvents including toluene, benzene, xylene, tetrahydrofuran, acetone, acetonitrile, carbon tetrachloride, chlorobenzene, cyclohexane, diethyl ether, dimethyl ether, dimethyl formamide, heptane, hexane, methylene chloride, pentane, combinations thereof, and the like.

In embodiments, the latex for forming the organic polymeric additive may be prepared in an aqueous phase containing a surfactant or co-surfactant, optionally under an inert gas such as nitrogen. Thus, in embodiments, the organic polymeric additive comprises latex particles produced by emulsion polymerization of at least one monomer and a surfactant.

The surfactant selected for the organic polymer or copolymer may be any suitable or desired surfactant. The surfactant can be a member of the group consisting of an anionic surfactant, a cationic surfactant, a non-ionic surfactant, and combinations thereof.

In embodiments, the surfactant comprises a member of the group consisting of sodium dodecylbenzene sulfonate, sodium dodecyl sulphate, and combinations thereof.

In certain embodiments, the surfactant selected for the present polymer or co-polymer surface additive is a surfactant having a selected surface tension which enables preparation of a smaller sized particle, in embodiments, wherein the polymeric composition comprises latex particles of the copolymer and the surfactant wherein the latex particles having a volume average particle diameter of less than 70 nanometers.

The organic polymeric additive can comprise latex particles having a volume average particle diameter of from about 30 nanometers to about 140 nanometers. In embodiments, the organic polymer or copolymer additive herein has a particle size of less than 70 nanometers, or less than 50 nanometers, or from about 20 to less than 70 nanometers, or from about 20 to about 50 nanometers, or from about 20 to less than 50 nanometers D50 by volume measured using a Nanotrac NPA252 from Microtrac, Inc.

In embodiments, an organic polymeric composition herein comprises latex particles of the copolymer and the surfactant, wherein the latex particles have a volume average particle diameter of from about 20 nanometers to less than 70 nanometers, or from about 20 nanometers to about 50 nanometers, or from about 20 nanometers to less than 50 nanometers.

In embodiments, a surfactant is selected having a minimum surface tension at critical micelle concentration of less than about 30 millinewtons per meter (mN/m). In embodiments, the surfactant selected has a minimum surface tension at critical micelle concentration of from about 10 to less than 30 mN/m, or from about 15 to less than 30 mN/m, or from about 15 to about 25 mN/m, or from about 15 to about 21 mN/m. In embodiments, the surfactant has a minimum surface tension at critical micelle concentration of less than 30 mN/m, or about 20 to about 25 mN/m. In embodiments, the surfactant selected has a minimum surface tension of less than about 45 mN/m.

In embodiments, the organic polymeric additive herein comprises latex particles produced by emulsion polymerization of at least one monomer and a surfactant; wherein the surfactant comprises a member of the group consisting of an anionic surfactant, a cationic surfactant, a non-ionic surfactant, and combinations thereof; and wherein the surfactant has a minimum surface tension of less than about 45 mN/m.

In embodiments, the organic polymeric additive comprises latex particles produced by emulsion polymerization of at least one monomer and a surfactant; wherein the surfactant comprises a member of the group consisting of sodium dodecylbenzene sulfonate, sodium dodecyl sulphate, and combinations thereof.

Surface tension of the surfactant can be measured by any suitable or desired method as known in the art. For example, surfactant surface tension can be measured by force tensiometry based on measuring the forces exerted on a probe that is positioned at the liquid-gas interface, as discussed in more detail in the Attension® White Paper and references included therein, entitled "Surface and interfacial tension,— what is it and how to measure it," by Susanna Lauren, Biolin Scientific. Two probe configurations are commonly used, the du Noüy ring and the Wilhelmy plate. A metal (such as platinum) rod can also be used instead of a Wilhelmy plate when sample volume is limited. Surface tension can also be measured optically, this is called optical tensiometry and is based on the analysis of a pendant drop shape.

As known in the art, critical micelle concentration (CMC) is defined as the concentration of surfactants above which micelles form and all additional surfactants added to the system go to micelles.

As known in the art, a micelle is an aggregate (or supramolecular assembly) of surfactant molecules dispersed in a liquid colloid. A typical micelle in aqueous solution forms an aggregate with the hydrophilic "head" regions in contact with surrounding solvent, sequestering the hydrophobic single-tail regions in the micelle center.

As discussed above, the surfactant selected can be any suitable or desired surfactant. In embodiments, the surfactant is selected to achieve a desired characteristic of smaller sized co-polymer surface additive. In embodiments, the surfactant is selected from the group consisting of dodecylbenzene sulfonate, trisiloxanes such as $((CH_3)_3SiO_2)_2Si-(CH_3)(CH_2)_3(OCH_2CH_2)_nOH$ with $n=4-12$, that have a surface tension at the critical micelle concentration of 20-21 mN/m, oxyethylated alcohols, $C_{14}EO_8$, $C_{12}EO_5$ and $C_{10}EO_4$, dimethyldidodecyl-ammonium bromide (DDAB); perfluorocarboxylic acids and salts thereof, $C_6F_{13}COOLi$, $C_7F_{15}COOH$, $C_7F_{15}COONa$, $C_8F_{17}COOH$, $C_8F_{17}COOLi$, $C_8F_{17}COONa$, $C_8F_{17}COONH_4$, $C_8F_{17}COONH_3C_2H_4OH$, $C_{10}F_{21}COOLi$, $C_{10}F_{21}COONH_4$, $C_{10}F_{21}COONH_3C_2H_4OH$, $C_{12}F_{25}COOLi$, salts of perfluoroalkanesulfonic acid, $C_8F_{17}SO_3Li$, $C_8F_{17}SO_3Na$, $C_8F_{17}SO_3NH_4$, $C_8F_{17}SO_3NH_3C_2H_4OH$, other specific fluorosurfactants include Novec™ FC-4430, FC-4432, FC-4434 non-ionic, polymeric surfactants from 3M™, FC-5120 anionic ammonium fluoroalkylsulfonate, specifically nonafluorobutyl [sulfonyl]amino-2-hydroxy-1-propanesulfonic acid, ammonia salt, from 3M™, Zonyl® FSN-100, Zonyl® FS-300, non-ionic ethoxylates from DuPont™, Zonyl® FS-500 an amphoteric betaine from DuPont™, Capstone™ FS-10 perfluoroalkylsulfonic acid from DuPont™, Capstone™ FS-30 non-ionic ethoxylate from DuPont™, Capstone™ FS-60 anionic blend from DuPont™, Capstone™ FS-61 anionic phosphate from DuPont™, Capstone™ FS-63 anionic phosphate from DuPont™, Capstone™ FS-64 anionic phosphate DuPont™, Capstone® FS-65 non-ionic from DuPont™. Highly branched hydrocarbon surfactants, including isostearyl sulphate Na salt, isostearyl sulphate tetrapropylammonium salt, and $(CH_3)_3CCH_2CH(CH_3)CH_2PO_4Na$ may also be selected. In embodiments, with an appropriate choice of counterion, the surface tension can be reduced to less than 30 mN/m at the critical micelle concentration, such as for dioctyl ammonium sulfosuccinate, dioctyl triethylamine sulfosuccinate, dioctyl trimethylamine sulfosuccinate, and dioctyl tetrapropylammonium sulfosuccinate. See, S. Alexander et al, Langmuir 2014, 30: 3413-3421. To address environmental concerns of fluorosurfactants regarding potential issues around bioaccumulation and environmental impact, 3M has created a nonafluorobutanesulphonyl fluoride intermediate that is converted into fluorosurfactants through a sulphonamide process. These new materials have a perfluoroalkyl group with $n \leq 4$ and are not of as much concern from a regulatory perspective as are fluorochemicals with $n > 4$. Previously commercialized under the Fluorad™ trademark, they are now replaced by Novec™, with surface tensions of 15-21 mN/m at concentration of 10-5 to 10-3 mol/L in pH 8 buffered aqueous solutions. See, Farn, R. J. (Ed.), (2006), Chemistry and Technology of Surfactants, Blackwell Publishing Ltd. In embodiments, the surfactant is a dodecylbenzene sulfonate. In other embodiments, the surfactant is sodium dodecylbenzene sulfonate.

In embodiments, the surfactants which may be utilized to form the latex dispersion can be used in an amount of from about 0.1 to about 15 weight percent of all of the ingredients of the latex, the monomers, water, initiator and surfactant, and in embodiments of from about 0.2 to about 5 weight percent of the all of the ingredients of the latex, the monomers, water, initiator and surfactant, and in embodiments from about 0.3 to about 2 weight percent of all of the ingredients of the latex, the monomers, water, initiator and surfactant.

In certain embodiments, a polymeric composition herein comprises a latex including latex particles of the copolymer and the surfactant and water, wherein the surfactant is present in an amount of from about 0.1 to about 15, or from about 0.2 to about 5, or from about 0.3 to about 2 percent by weight, based upon the weight of all the latex ingredients, including the resin, the water, the surfactant, and the initiator. In embodiments, the surfactant is present in an amount of from about 0.3 to about 2 percent by weight, based upon the weight of all the ingredients in the latex, including the monomers, the water, the initiator and the surfactant.

In embodiments initiators may be added for formation of the latex utilized in formation of the organic polymeric additive. Examples of suitable initiators include water soluble initiators, such as ammonium persulfate, sodium persulfate and potassium persulfate, and organic soluble initiators including organic peroxides and azo compounds including Vazo™ peroxides, such as VAZO 64™, 2-methyl 2-2,-azobis propanenitrile, VAZO 88™, 2-2'-azobis isobutyramide dehydrate, and combinations thereof. Other water-soluble initiators which may be utilized include azoamidine compounds, for example 2,2',-azobis(2-methyl-N-phenyl-propionamidine) dihydrochloride, 2,2'-azobis[N-(4-chloro-phenyl)-2-methylpropionamidine] di-hydrochloride, 2,2',-azobis [N-(4-hydroxyphenyl)-2-methyl-propionamidine] dihydrochloride, 2,2',-azobis [N-(4-amino-phenyl)-2-methylpropionamidine]tetrahydrochloride, 2,2',-azobis [2-methyl-N(phenylmethyl)propionamidine]dihydrochloride, 2,2',-azobis [2-methyl-N-2-propenylpropionamidinedihydrochloride, 2,2',-azobis[N-(2-hydroxy-ethyl)2-methylpropionamidine]dihydrochloride, 2,2'-azobis [2(5-methyl-2-imidazolin-2-yl)propane]dihydrochloride, 2,2'-azobis [2-(2-imidazolin-2-yl)propane]dihydrochloride, 2,2'-azobis [2-(4,5,6,7-tetrahydro-1H-1,3-diazepin-2-yl)propane] dihydrochloride, 2,2,-azobis[2-(3,4,5,6-tetrahydropyrimidin-2-yl)propane]dihydrochloride, 2,2',-azobis [2-(5-hydroxy-3,4,5,6-tetrahydropyrimidin-2-yl) propane]dihydrochloride, 2,2',-azobis{2-[1-(2-hydroxyethyl)-2-imidazolin-2-yl]propane}dihydrochloride, combinations thereof, and the like.

Initiators can be added in suitable amounts, such as from about 0.1 to about 8 weight percent, or from about 0.2 to about 5 weight percent, of the monomers.

In forming the emulsions, the starting materials, surfactant, optional solvent, and optional initiator may be combined utilizing any means within the purview of those skilled in the art. In embodiments, the reaction mixture may be mixed for from about 1 minute to about 72 hours, in embodiments from about 4 hours to about 24 hours, while keeping the temperature at from about 10° C. to about 100° C., or from about 20° C. to about 90° C., or from about 45° C. to about 75° C.

Those skilled in the art will recognize that optimization of reaction conditions, temperature, and initiator loading can be varied to generate polymers of various molecular weights, and that structurally related starting materials may be polymerized using comparable techniques.

The resulting latex, possessing the polymeric additive of the present disclosure, may have a C/O ratio of from about 3 to about 8, in embodiments from about 4 to about 7.

In embodiments, once the polymer or copolymer utilized as the additive for the 3D powder has been formed, it may be recovered from the latex by any technique within the purview of those skilled in the art, including filtration, drying, centrifugation, spray draying, combinations thereof, and the like.

In embodiments, once obtained, the copolymer utilized as the additive for a 3D powder may be dried to powder form by any method within the purview of those skilled in the art, including, for example, freeze drying, optionally in a vacuum, spray drying, combinations thereof, and the like. Thus, in embodiments, the copolymer additive herein may be dried and then later redispersed in water, for application according to the process herein.

In embodiments, the present process comprises providing a three-dimensional printing powder dispersion comprising a three-dimensional printing powder, an optional dispersing agent, and water; providing an emulsion of an organic polymeric additive; combining the three-dimensional printing powder dispersion and the emulsion of organic polymeric additive to form a mixture comprising the three-dimensional printing powder dispersion and the emulsion of organic polymeric additive; and drying the mixture of the three-dimensional printing powder dispersion and the emulsion of organic polymeric additive to provide a three-dimensional printing composition.

Thus, the process herein comprises applying the organic polymeric additive to a three-dimensional printing powder in water. The organic polymeric additive is added, for example, in the form of a latex emulsion or aqueous dispersion, to the surface of a three-dimensional printing polymeric powder. In embodiments, the three-dimensional printing polymeric powder is in a dispersion and the emulsion or aqueous dispersion of organic polymeric additive is added to the dispersion of three-dimensional printing powder.

An additional advantage of adding the polymerized latex surface additive in an aqueous dispersion is that no drying of the additive is required, which reduces cycle time as well as eliminating the drying cost, which can account for a major portion of the processing cost. If the 3D printing powder is produced by an aqueous chemical process, then the polymerized latex can be added at the end of that aqueous process. If the 3D powder is produced in solvent, or by grinding or jetting, then it may be necessary to add some surfactant to the 3D powder to re-disperse it with the polymeric latex. If the 3D powder was a dry powder throughout its production, then re-dispersing in water to add the emulsion polymerized latex may be required. This may not necessarily be as cost effective, given the re-dispersion and subsequent drying required for the 3D powder, but may be desired for other considerations. Thus, coating a dry 3D powder that was produced by grinding could be done by the process of this invention, in embodiments, the present process provides even further benefits for 3D powders that need to be dried anyway as part of their production. In embodiments, the process herein comprises providing a three-dimensional printing powder dispersion comprising a three-dimensional printing powder, and optional dispersing agent, and water, wherein the three-dimensional printing powder was not previously dried.

The organic polymer or copolymer additive herein is a smaller size than previous organic toner additives. In embodiments, the organic polymer or copolymer additive has an average or median volume average particle size (d50) of less than 70 nanometers. In embodiments, the organic polymer or copolymer additive has an average or median particle size (d50) of from about 20 nanometers to less than 70 nanometers, or from about 20 nanometers to about 65 nanometers, or from about 20 to about 60 nanometers, or from about 20 to about 50 nanometers. In specific embodiments, the copolymer toner additive herein has an average or median particle size (d50) of less than 50 nanometers, such as from about 20 to less than 50 nanometers.

In embodiments, a process herein for preparing a three-dimensional printing composition comprises providing a three-dimensional printing powder; providing an organic polymeric additive on at least a portion of an external surface of the three-dimensional printing powder, wherein the organic polymeric additive is provided in the form of a latex emulsion or aqueous dispersion; and optionally, further providing an inorganic additive on at least a portion of an external surface of the three-dimensional printing powder; wherein the organic polymeric additive is prepared by emulsion polymerization.

Any suitable or desired 3D powder may be selected. In embodiments, the three-dimensional polymeric printing powder is selected from the group consisting of polyamides (PA), polyethylenes (PE), polypropylenes (PP), polyalkanoates, polyesters, polyaryl ether ketones (PAEK), polycarbonates, polyacrylates, polymethacrylates, polystyrenes, polystyrene-acrylates, polyurethanes (PU), thermoplastic polyurethanes (TPU), polyether block amides (PEBA), polyalkyl siloxanes, fluorinated polymers, perfluoropolyether (PFPE) acrylates, and PFPE methacrylates; and copolymers thereof, and combinations thereof. Optionally, the three-dimensional printing powder is filled with a non-polymeric material. In certain embodiments, the three-dimensional polymeric printing powder is selected from the group consisting of polyamide 12 (PA12), polyamide 11 (PA11), polyamide 6 (PA6), polyamide 6,12 (PA6,12), low density polyethylene, high density polyethylene, polyhydroxybutyrate (PHB), polyhydroxyvalerate (PHV), polylactic acid (PLA), polyether ether ketone (PEEK), polyether ketone (PEKK); polyoxymethylene (POM), polymethyl methacrylate (PMMA), polystyrene (PS), high-impact polystyrene (HIPS), polyacrylates and polystyrene-acrylates; polyurethanes (PU), polyacrylonitrile-butadiene-styrene (ABS), polyvinyl alcohol (PVA), polydimethysiloxane (PDMS), polytetrafluoroethylene (PTFE), polyvinyl fluoride (PVF), polyvinylidene fluoride (PVDF), and combinations thereof. In embodiments, the three-dimensional polymeric printing powder is selected from the group consisting of polyamides, polyethylenes, polyalkanoates, polyesters, polyether ether ketones, polycarbonates, polyacrylates, polystyrene-acrylates, polyurethanes, copolymers thereof, and combinations thereof. Polyamide is the chemical name for nylon, thus for example, polyamide 12 is also known as nylon 12.

In certain embodiments, the three-dimensional polymeric printing powder is selected from the group consisting of low density polyethylene, high density polyethylene, polylactic acid, polyoxymethylene, polymethyl methacrylate, polystyrene, acrylonitrile butadiene styrene, polyamide 12 (PA12), polyamide 11 (PA11), polyhydroxybutyrate (PHB), polyhydroxyvalerate (PHV), poly ether ketone (PEEK), copolymers thereof, and combinations thereof.

In embodiments the polymeric powder can be filled with a non-polymeric material, including glass beads, mineral fillers, pigments, carbon black, carbon fiber, fire retardants, ceramic particles, silica particles, alumina particles, titania particles and metal particles.

In embodiments, the polymeric powder can be filled with a metal, a metal alloy, or a combination thereof. In embodiments, the polymeric powder can be filled with a metal selected from the group consisting of aluminum and aluminum alloys, stainless steel, tool steel, titanium and titanium alloys, copper and copper alloys, brass, cobalt chrome (also known as cobalt chromium) alloys, nickel iron alloys, nickel chromium superalloys, precious metals, such as gold, platinum, palladium, and silver, and in embodiments can be filled with an exotic metal powder, including palladium, tantalum and, rhenium and niobium. In embodiments, specific metals powders that can be utilized for filling the polymeric powder include stainless steel metal powders, including 316L (low-carbon), 17-4PH, hot-work and maraging steel; low-density aluminum alloys like $AlSi_{10}Mg$ and $AlSi_{12}$; $AlSi_7Mg_{0.6}$, 6061 and 7075-series aluminum alloys; cobalt chrome alloys including ASTM F75 CoCr; titanium alloys including Ti$_6$Al$_4$V and Ti$_6$Al$_4$V (ELI), where Ti$_6$Al$_4$V is a titanium alloy that is 6 percent aluminum and 4 percent vanadium; unalloyed, commercially pure titanium which is available in grades one through four; nickel chromium super-alloys like Inconel® 718 and Inconel® 625; nickel iron alloys such as FeNi$_{36}$ or 64FeNi in the U.S., and also known as Invar®; nickel iron cobalt alloys such as Kovar® a nickel-cobalt ferrous iron alloy compositionally identical to Fernico 1.

Suitable specific powders for 3D printing can be obtained from Prodways, who supply PA12-S 1550, PA12-L 1500, PA11-SX 1350, PA11-SX 1450, Ultrasint PA6-X028 polyamide powders, TPU-70 thermoplastic polyurethane, PA12-GFX 2550 glass beads and aluminum filled PA12, PA12-GF 2500, glass beads filled PA12, PA12-MF 6150 a mineral fabric filled PA12, PA12-CF 6500 carbon fiber-filled PA12, PA11-GF 3450, glass filled PAH polyamide, Ultrasint PA6-X028 and PA612-GB 3800 glass bead filled polyamide 6,12, from CRP Technology S.R.L who supply Windform® SP and Windform® XT 2.0 carbon fiber reinforced composite polyamides, Windform® FX BLACK polyamide powder, Windform® GT polyamide based glass fiber reinforced polyamide with a dark black color; Windform® RL thermoplastic elastomer; Windform® LX 2.0 and Windform® LX 3.0 composite polyamide based material reinforced with glass fiber, VICTREX® PEEK 150UF10, VICTREX™ PAEK, Victrex™ VICOTE™ 707 polyether ether ketone (PEEK); from Oxford Performance Materials (OPM), who provides OXPEKK® polyether ketone (PEKK); from Evonik who supplies Vestosint® polyamide 12 powders in d50 sizes of about 6 to about 100 micron; from EOS PrimePart® ST polyether block amide (PEBA) 3D powder, PA 2200 and PA 2201 white colored polyamide powder, PA 2202 black pigmented polyamide powder, PA 1101 whitish-translucent polyamide 11, PA 1102 black pigmented polyamide 12, PA 2210 FR white polyamide 12 powder with a halogen free chemical flame retardant, PrimePart FR (PA 2241 FR) polyamide 12 with flame retardant, PA 3200 GF glass bead filled polyamide 12, EOS PEEK HP3 which is a PAEK, EOS PP1101 polypropylene (unfilled), Alumide® polyamide 12 aluminum-filled powder, CarbonMide® polyamide 12 carbon fiber-reinforced powder, PrimeCast® 101 polystyrene powder, PrimePart PLUS (PA 2221) polyamide 12 powder, and PrimePart® ST (PEBA 2301); from EOS which also markets 3D powders from Advanced Laser Materials (ALM), ALM HP 11-30 a carbon-fiber-reinforced polyamide 11 powder, ALM FR-106 a polyamide 11 with flame retardant, and ALM PA 640-GSL polyamide 12 filled with hollow glass microspheres; from ALM 3D PA 802-CF carbon filled polyamide 11, TPE 210 thermoplastic elastomer, PS 200 polystyrene, PA D80-ST unfilled polyamide 11, PA 650 unfilled polyamide 12, PA 250 unfilled polyamide 12, PA 840-GSL glass sphere filled polyamide 11, FR-106 fire-retardant polyamide 11, PA 606-FR fire-retardant polyamide 12, PA850 and PA 860 unfilled polyamide 11, PA 614-GS, PA 615-GS, PA 616-GS and PA 640-GSL glass sphere filled polyamide 12, PA 603-CF carbon fiber filled polyamide 12, PA 605-A aluminum filled polyamide 12, PA 620-MF mineral fiber filled polyamide 12, PA 415-GS glass sphere filled polyamide 12, HT-23 PEKK carbon fiber filled, TPE 360 copolyester, HP 11-30 carbon fiber filled polyamide 11, and TPE 300 a TPU elastomer powder.

In embodiments, the composition may further include a second larger organic polymer or copolymer additive comprising an organic cross-linked surface additive having a particle size of from about 70 nanometers to about 250 nanometers in diameter. These larger particles of copolymer surface additive may have an average or median particle size (d50) of from about 70 nanometers to about 250 nanometers in diameter, or from about 80 nanometers to about 200 nanometers in diameter, or from about 80 to about 115 nanometers. Advantageously, the teachings of the present disclosure render it easier to arrive at the desired particle size, in embodiments, a copolymer size as described herein.

If the second, larger size copolymer organic additive comprising an organic cross-linked surface additive is present, it can be present in an amount of from about 0.1 parts per hundred by weight to about 5 parts per hundred by weight, or from about 0.2 parts per hundred by weight to about 0.4 parts per hundred by weight, or 0.3 parts per hundred by weight to about 1.5 parts per hundred by weight, based on 100 parts by weight of base toner particles.

The three-dimensional printing powder composition may include two or more emulsion polymerized latex organic polymer or copolymer additives where the average D50 particle size of the organic polymer or copolymer additive differs by at least 10 nanometers. In embodiments, the three-dimensional printing composition comprises two or more organic polymeric additives; wherein a first organic polymeric additive has a first average D50 particle size; wherein a second organic polymeric additive has a second average D50 particle size; and wherein the first and second average D50 particle size differ by at least about 10 nanometers.

The copolymers utilized as the organic polymeric additive, in embodiments, are not soluble in solvents such as tetrahydrofuran (THF) due to their highly cross-linked nature. Thus, it is not possible to measure a number average molecular weight (Mn) or a weight average molecular weight (Mw), as measured by gel permeation chromatography (GPC).

The polymer or copolymers utilized as the organic polymeric additive may have a glass transition temperature (Tg) of from about 45° C. to about 200° C. In embodiments, the organic polymeric additive has a glass transition temperature of from about 85° C. to about 140° C., in embodiments from about 100° C. to about 130° C.

The organic polymeric surface additive composition may be combined with a 3D printing powder so that the organic polymeric surface additive is present in an amount of from about 0.1 percent to about 2 percent by weight, or from about 0.2 percent to about 1.4 percent by weight, or from about 0.3 percent to about 1 percent by weight, based upon the weight of the 3D printing powder. In certain embodiments, the organic polymeric surface additive having a volume average particle diameter of from about 20 nanometers to less than 70 nanometers is present in an amount of from about 0.1 parts per hundred to about 2 parts per hundred by weight, based on 100 parts by weight of base 3D printing powder. In embodiments, the polymeric composition may cover from about 5 percent to about 100 percent, or from about 10 percent to about 100 percent, or from about 20 percent to about 50 percent of the surface area of the 3D powder particles.

In embodiments, the organic polymeric additive has a total surface loading of from about 0.01 to about 5 parts per hundred by weight based on the weight on the three-dimensional printing powder.

In embodiments, the three-dimensional printing powder and the organic polymeric additive are combined to form a mixture according to the formula $$0.2 < (w \cdot D \cdot P)/(0.363 \cdot d \cdot p) < 1.2$$

wherein, for the three-dimensional printing powder, D is the D50 average size of the powder in microns and P is the true bulk density in grams/cm³; and wherein, for the organic polymeric additive, d is the D50 average particle size in nanometers, p is the true bulk density is grams/cm³, and w is the weight of the emulsion of organic polymeric additive added to the mixture in added to the mixture in parts per hundred based on solids loading of the emulsion or organic polymeric additive in the emulsion of organic polymeric additive.

In embodiments, a 3D printing composition herein may contain the organic polymeric or copolymeric additive of the present disclosure described above, as well as other optional additives, as desired or required.

There can also be blended with the 3D printing powder external additive particles including flow aid additives. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN™ 700, and mixtures thereof. In embodiments, the 3D printing composition herein further comprises cleaning additives selected from the group consisting of stearates, cerium oxide, strontium titanate, and combinations thereof.

In embodiments, silica may be applied to the 3D powder surface for powder flow, reduced water adsorption, and higher blocking temperature. Titania may be applied for improved powder flow, reduced water adsorption, or to reduce 3D powder charging, which can make the 3D particles stick to each other. Zinc stearate, calcium stearate and/or magnesium stearate may optionally also be used as an external additive for providing lubricating properties of the surface, which can help powder flow as well as reduced water adsorption. In embodiments, a commercially available zinc stearate known as Zinc Stearate L, obtained from Ferro Corporation, may be used. The external surface additives may be used with or without a coating.

In embodiments, the 3D printing composition further comprises a member of the group consisting of a silica surface additive, a titania surface additive, and combinations thereof. In embodiments, the 3D printing composition comprises a silica additive, a titania additive, or a combination thereof, and at least one of the silica or titania additives has a hydrophobic treatment, in embodiments, one or more of the silica or titania additives has a polydimethylsiloxane hydrophobic treatment.

Each of these external additives may be present in an amount from about 0 parts per hundred to about 3 parts per hundred of the 3D printing powder, in embodiments from about 0.25 parts per hundred to about 2.5 parts per hundred of the 3D printing powder, although the amount of additives can be outside of these ranges. In embodiments, the toners may include, for example, from about 0 parts per hundred to about 3 parts per hundred titania, from about 0 parts per hundred to about 3 parts per hundred silica, and from about 0 parts per hundred to about 3 parts per hundred zinc stearate.

In embodiments, in addition to the organic polymeric additive of the present disclosure, the 3D printing composition may also possess silica in amounts of from about 0.1 parts per hundred to about 5 parts per hundred by weight of the 3D printing particles, in embodiments from about 0.2 parts per hundred to about 2 parts per hundred by weight of the 3D printing powder, and titania in amounts of from about 0 parts per hundred to about 3 parts per hundred by weight of the 3D printing powder, in embodiments from about 0.1 parts per hundred to about 1 parts per hundred by weight of the 3D printing powder.

The 3D printing compositions herein can be used for any suitable or desired process. The 3D printing compositions can be used in a printing process, in embodiments, in laser beam melting printing processes or selective laser sintering processes. In embodiments, a method herein comprises providing a three-dimensional printing powder having an organic polymeric additive on at least a portion of an external surface of the three-dimensional printing powder; and optionally, further having an inorganic additive on at least a portion of an external surface of the three-dimensional printing powder; and exposing the three-dimensional printing powder having the organic polymeric additive and optional inorganic additive to a laser to fuse the three-dimensional printing powder.

Also provided is a method of selective laser sintering comprising providing a 3D printing composition as described herein; and exposing the 3D printing composition to a laser to fuse the printing powder.

Any three dimensional printer or type of SLS printer can be employed. See, for example, U.S. Patent Publication 2018/0022043, which is hereby incorporated by reference herein in its entirety.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Organic polymeric latex additives were produced by emulsion polymerization. The 5-gallon runs were post-processed for 1 hour at 77° C. following by a 2 hour ramp to 87° C. followed by a 1 hour process at ° C. The 2-L runs were post-processed for 1 hour at 77° C.

It has been discovered that particle sizes of greater than 70 nanometers may degrade flow, but provide excellent blocking resistance. Particle sizes of about less than 70 nanometers will provide improved flow, as well as provide some blocking resistance. In embodiments, a small size latex, in embodiments of about 47 nanometers in diameter, was prepared to demonstrate flow improvement for the 3D particles.

Process for preparation of 5-gallon polymeric latex. A polymeric latex was synthesized by a semi-continuous starve-fed emulsion polymerization process. An emulsified monomer mixture was prepared in a portable tank by mixing monomers, 2.671 kilograms cyclohexyl methacrylate (CHMA), 0.9 kilograms divinylbenzene 55% technical grade (DVB-55), and 28.81 grams 2-(dimethylamino)ethyl methacrylate (DMAEMA), into a surfactant solution containing 922.14 grams 20.9% Tayca BN2060 solution and 3.591 kilograms deionized water.

A separate aqueous phase mixture was prepared in a 5-gallon reaction vessel by mixing 395.2 grams 20.9% Tayca BN2060 solution with 9.265 kilograms deionized water, which was then heated to 77° C. with continuous mixing at 225 rpm. A polymer seed was prepared by adding 3% of the emulsified monomer into the reactor and mixing for a minimum of 15 minutes. After the reactor's temperature reached around 77° C., the initiator solution of 0.403 kilograms deionized water and 13.83 grams ammonium persulfate (APS) were added over 7 minutes to polymerize the seed particles. Following a 15 minute wait time, the remaining emulsified monomer was added at a controlled feed rate to the reactor over a two hours period to polymerize and grow the polymer seed particles. Once the monomer feeding is complete, the reactor was held at the reaction temperature for an extra hour, then ramped over 2 hours to an elevated temperature of 87° C. and held for an additional 2 hours to lower the residual monomers levels. During the post reaction process the latex was buffered with 0.1 M sodium hydroxide (NaOH) solution to maintain pH between 5.5 and 6.0. The latex was then cooled to room temperature and discharged through 5 micron welded polypropylene filter bag. The resulting product was an aqueous polymer latex that contains about 20 weight percent solids. The final particle size of the latex was 47 nanometers. Particle size was determined using a Nanotrac NPA252 with the following settings: Distribution—Volume, Progression—Geom 4 Root, Residuals—Enabled, Particle Refractive Index—1.59, Transparency—Transparent, and Particle Shape—Spherical.

A portion of the 5-gallon latex was spray dried using a dual liquid nozzle DL41 spray dryer from Yamato Scientific Co. with drying conditions of:

Atomizing pressure: 4 kgf/cm$^2$

Sample feed rate: 3 (0.6 liters/minute)

Temperature: 140° C.

Aspirator flow rate: 4 m$^3$/minute

About 90 grams of dried latex was produced from the portion of latex that was dried.

Table 1 shows formulation for the organic polymeric additive examples. Table 2 shows process parameters. Table 3 shows particle size and residual monomers.

TABLE 1

| Example | % Solids | % SLS | % SLS Upfront | % APS | % Seed |
|---|---|---|---|---|---|
| 1 | 20 | 0.4 | 44.15 | 0.38 | 5 |
| 2 | 20 | 0.4 | 44.15 | 0.38 | 5 |
| 3 | 20 | 0.4 | 50 | 0.38 | 5 |
| 4 | 20 | 0.5 | 50 | 0.38 | 5 |
| 5 | 20 | 0.5 | 50 | 0.5 | 5 |
| 6 | 20 | 0.5 | 50 | 0.5 | 3 |
| 7 | 20 | 0.5 | 50 | 0.65 | 2.5 |
| 8 | 18 | 0.48 | 50 | 0.38 | 5 |
| 9 | 20 | Tayca 1.24 | 30 | 0.38 | 5 |
| 10 | 20 | Tayca 1.24 | 30 | 0.38 | 3 |

SLS = sodium lauryl sulphate.
APS = ammonium persulfate.

TABLE 2

| Example | Reactor Size | Mixing rpm | Monomer Feed Time (Hours) |
|---|---|---|---|
| 1 | 2 Liter | 400/450 | 2 |
| 2 | 5 Gallon | 225/275 | 2 |
| 3 | 2 Liter | 400/450 | 2 |
| 4 | 2 Liter | 400/450 | 2 |
| 5 | 2 Liter | 400/450 | 2 |
| 6 | 5 Gallon | 250/300 | 2 |
| 7 | 2 Liter | 450/500 | 2 |
| 8 | 2 Liter | 400/450 | 2 |
| 9 | 2 Liter | 400/450 | 2 |
| 10 | 5 Gallon | 225/275 | 2 |

TABLE 3

| | Particle Size | GC Residual Monomers | | |
| Example | (Nanometers) | CHMA (ppm) | DVB (ppm) | Total (ppm) |
|---|---|---|---|---|
| 1 | 60.1 | NA | NA | NA |
| 2 | 63.2 | 25 | 16 | 41 |
| 3 | 68.2 | NA | NA | NA |
| 4 | 57.4 | NA | NA | NA |
| 5 | 56.8 | NA | NA | NA |
| 6 | 58.6 | 27 | 10 | 37 |
| 7 | 74.5 | NA | NA | NA |
| 8 | 54.0 | NA | NA | NA |
| 9 | 49 | NA | NA | NA |
| 10 | 47 | <30 | <40 | <70 |

NA = not applicable.
ND = not detected.
Polymer Particles.

The 3D polymeric powder may be comprised of polyamide such as PA12, PA11, high density polyethylene, polylactic acid (PLA), polyalkanoates (PHB, PHV) and other polyesters, PEEK and others.

The 3D particles chosen for the present embodiments were PA12 powder of average size of about 54 microns and particle true density of 1.14 g/cm$^3$ prepared at the Xerox Research Center of Canada as described in Example 11.

Figures 3, 4:
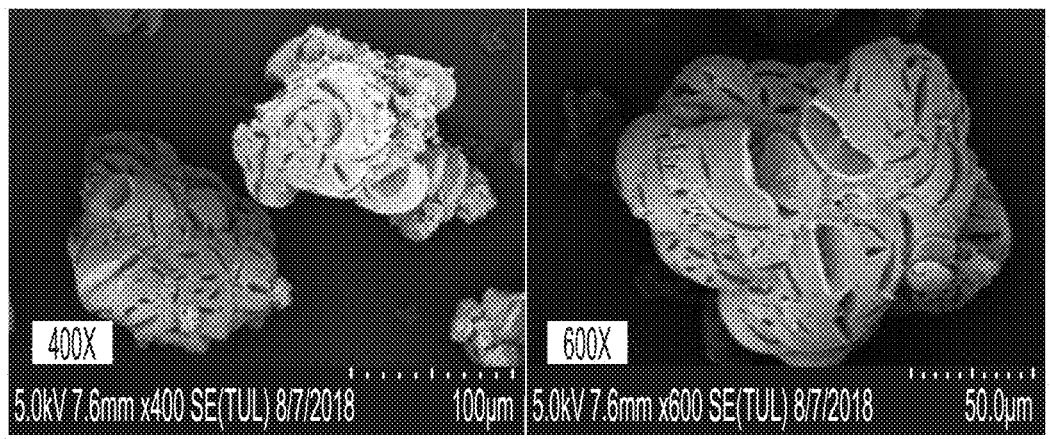
FIG. 3 shows a scanning electron micrograph of PA12 polyamide particles at 400× magnification.
FIG. 4 shows a scanning electron micrograph of PA12 polyamide particles at 600× magnification.

FIGS. 1, 2, 3, and 4 show scanning electron micrograph SEM images of irregularly shaped PA12 particles. FIG. 1 shows a SEM image of PA12 particles at 50×magnification. FIG. 2 shows a SEM image of PA12 particles at 100× magnification. FIG. 3 shows a SEM image of PA12 particles at 400× magnification. FIG. 4 shows a SEM image of PA12 particles at 600× magnification.

Figure 5:
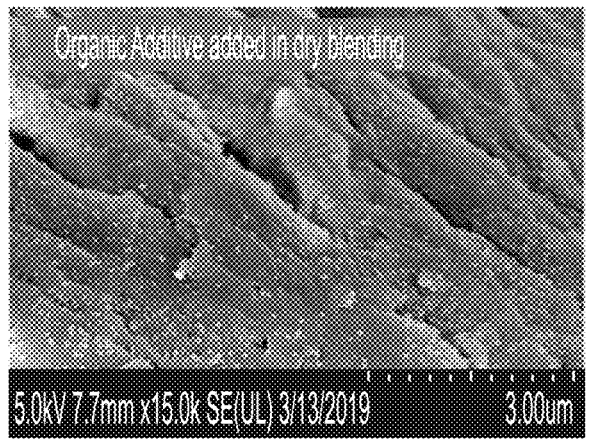
FIG. 5 shows a scanning electron micrograph of PA12 polyamide particles at 15,000× magnification having an organic additive disposed thereon by dry blending.

FIG. 5 shows a scanning electron micrograph of PA12 polyamide particles at 15,000× magnification having an organic additive disposed thereon by dry blending as described in Comparative Example 13.

Figure 6:
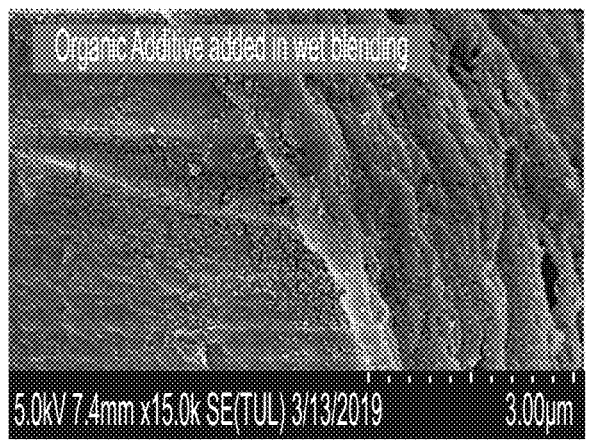
FIG. 6 shows a scanning electron micrograph of PA12 polyamide particles at 15,000× magnification having an organic additive disposed thereon by aqueous wet blending in accordance with the present embodiments.

FIG. 6 shows a scanning electron micrograph of PA12 polyamide particles at 15,000× magnification having an organic additive disposed thereon by aqueous wet blending as described in Example 14.

Example 11

Into a 50 gallon reactor is added 12.63 kilograms of polyamide PA12 granular resin and 126.3 grams of 50 micrometer silica gel powder that is dissolved in 129.85 kilograms of N-methyl-2-pyrrolidone (NMP) solvent with mixing at elevated temperature in an inert atmosphere. Once all the polymer is dissolved at 180° C. the solution is quickly cooled to 130° C. to precipitate the polymer out of solution. The material is further cooled to room temperature with agitation and then discharged and rinsed with more NMP and then deionized water and methanol. The material is vacuum dried at elevated temperature such as 90° C. and then stored until required for additive blending. The average size of these particles was 54 microns.

Organic Polymeric Additive Blending

Mathematically the general ideal formula for the coverage of spherical organic surface additive on a larger particle surface is given by:

$$0.2 < (w \cdot D \cdot P)/(0.363 \cdot d \cdot p) < 1.2$$

where for the 3D powder, D is the D50 average size in microns and P is the true density in grams/cm$^3$, and for the organic emulsion polymerized latex, d is the D50 average size in nanometers, p is the true density in grams/cm$^3$, and w is the weight added to the mixture in pph on a dry weight basis, that is, based on the solid content of the polymeric latex.

In embodiments, for the three-dimensional printing powder, D is the D50 average size of the powder in microns and P is the true bulk density in grams/cm$^3$; and for the organic polymeric additive, d is the D50 average particle size in nanometers, p is the true bulk density is grams/cm$^3$, and w is the weight of the emulsion of organic polymeric additive added to the mixture in parts per hundred based on solids loading of the emulsion of organic polymeric additive in the emulsion of organic polymeric additive.

In general, effective amounts of an additive for flow or blocking range can be from about 0.2 to 1.2 of full coverage. The value of 0.2, indicates 0.2 of the surface is covered, and a value of 1 indicates full coverage of the surface. If the particles have some surface roughness or are not truly spherical they will require somewhat higher coverage as their surface area is higher than expected based on the size and density, so a value as high as 1.2 may be required, as indicated in the formula.

For the PA12 powder having a particle size of 54 microns, a density of 1.15 g/cm$^3$, and the organic additive of Example 10 having a particle size of 47 nanometers and a density of 1.14 g/cm$^3$, w=0.32 pph for about full coverage.

It is also desirable that the particle shape is spherical to induce a free flowing powder. To access particle flow, aerated and tap bulk density are measured and then that data is used to calculate the Hausner ratio HR. A material with a Hausner ratio HR<1.25 is an indication of a free flowing powder behaviour, 1.25 to 1.5 as moderate flowing, and a HR>1.5 means a poor flowing powder with fluidization problems due to high cohesive forces. Particle density impacts the fluid bed density which is influenced by the particle shape. An alternate measurement for flow of a powder is angle of repose, the lower the angle of repose the better the flow of the powder. The following Table 4 categorizes flow according to R. L. Carr, Evaluating Flow Properties of Solids, Chem. Eng. 1965, 72, 163-168.

TABLE 4

| Flow Property | Angle of Repose (degrees) |
| --- | --- |
| Excellent | 25-30 |
| Good | 31-35 |
| Fair - aid not needed | 36-40 |
| Passable - may hang up | 41-45 |
| Poor - must agitate, vibrate | 46-55 |
| Very poor | 56-65 |
| Very, very poor | >66 |

Comparative Example 12

Using 50 grams of PA12 particles of Example 11, the particle bulk density and angle of repose were evaluated. Both aerated bulk density and tapped bulk density were measured and used to determine compaction which is reported as the Hausner Ratio without surface additives. See Table 4.

Comparative Example 13

PA12 With Organic Additive Added in Dry Blending Process. Dry particles of the organic additive of Example 10 at 0.32 pph (1.5 grams) was added to 50 grams of PA12 powder of Example 11 and mixed on a lab SKM Mill at 13,500 rpm for 30 seconds. After the blending step was completed, the blended material was sieved through a 150 micron stainless steel sieve and the material was put into a bottle and evaluated for flow and angle of repose.

Example 14

PA12 With Organic Additive Added in an Aqueous Dispersion. 95 grams of dried PA12 powder of Example 12 was redispersed with 100 grams Triton™-X (Polyethylene glycol tert-octylphenyl ether, Sigma-Aldrich®) 1%-weight and 200 milliliters of deionized water. The slurry was sonicated for 20-30 seconds using a Branson Digital Sonifier®. Undried particles of the organic additive of Example 10 at 0.32 pph based on a dry solids loading basis (1.62 grams of latex at 18.60% solids) was added dropwise with stirring to the slurry. The slurry was poured into a freeze dryer bottle, frozen on a VirTis Freezemobile and dried on a Dura-Dry® freeze dryer for 48 hours. The moisture content of the dried blended particles was 0.97%.

While dried 3D powder, such as dried PA12 powder, may be employed, it is not necessary to dry the 3D powder. In embodiments, the polymeric latex additive is added prior to drying the 3D powder. The re-dispersion step used in either case is similar, though if the 3D powder had not been dried, less surfactant or perhaps no surfactant is required to re-disperse the 3D powder.

Evaluation of flow properties of Comparative Example 12, Comparative Example 13, and Example 14 is provided in Table 5.

TABLE 5

| | Bulk Density | | | Angle of |
| --- | --- | --- | --- | --- |
| Example | Aerated Bulk Density (g/cc) | Tapped Bulk Density (g/cc) | Compaction (Hausner Ratio) | Repose Angle (°) Average |
| Comparative Example 12 | 0.33 | 0.44 | 1.35 | 40.0 |
| Comparative Example 13 | 0.37 | 0.46 | 1.22 | 33.6 |
| Example 14 | 0.32 | 0.37 | 1.17 | 32.5 |

The examples show that the organic polymeric additive with wet addition has effectively changed the 3D powder from a moderately flowing powder to a free flowing powder, based on the Hausner ratio, as well as providing a significant improvement in lowering the angle of repose. According to Table 4, the original PA12 particles are borderline for flow at 40 degrees, at the edge of "fair—aid not needing" (aid here means flow aid), nearing 41 degrees, which is "passable—may hang up". With the organic polymeric additive added by wet addition, the flow is rated "good" based on angle of repose. The wet addition has similar effectiveness to the dry blending, while avoiding the cost of drying the polymeric latex additive.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A process comprising:
    providing a three-dimensional printing powder dispersion comprising a three-dimensional printing powder, water, and optionally, a dispersing agent;
    wherein the three-dimensional polymeric printing powder is selected from a member of the group consisting of polyamides, polyethylenes (PE), polypropylenes (PP), polyalkanoates, polyesters, polyaryl ether ketones (PAEK), polycarbonates, polyacrylates, polymethacrylates, polystyrenes, polystyrene-acrylates, polyurethanes (PU), thermoplastic polyurethanes (TPU), polyether block amides (PEBA), polyalkyl siloxanes, fluorinated polymers, perfluoropolyether (PFPE) acrylates, PFPE methacrylates, and combinations thereof; and optionally, wherein the three-dimensional printing powder is filled with a non-polymeric material;
    providing an emulsion of an organic polymeric additive;
    wherein the emulsion of organic polymeric additive comprises latex particles produced by emulsion polymerization of at least one monomer and a surfactant;
    wherein the surfactant comprises a member of the group consisting of an anionic surfactant, a cationic surfactant, a non-ionic surfactant, and combinations thereof;
    wherein the surfactant has a minimum surface tension of less than about 45 mN/m;
    wherein the organic polymeric additive is a polymer or copolymer comprising a first monomer having a high carbon to oxygen ratio of from about 3 to about 8; optionally, a second monomer comprising two or more vinyl groups, wherein the second monomer, if present, is present in the copolymer in an amount of from greater than about 8 percent by weight to about 40 percent by weight, based on the weight of the copolymer; and optionally, a third monomer comprising an amine, wherein the third monomer, if present, is present in an amount of from about 0.1 percent by weight to about 1.5 percent by weight, based on the weight of the copolymer;
    wherein the organic polymeric additive has a volume average particle diameter of from about 20 nanometers to less than 50 nanometers;
    combining the three-dimensional printing powder dispersion and the emulsion of organic polymeric additive to form a mixture comprising the three-dimensional printing powder dispersion and the emulsion of organic polymeric additive;
    wherein the three-dimensional printing powder and the organic polymeric additive are combined to form the mixture according to the formula $$0.2 < (w \cdot D \cdot P)/(0.363 \cdot d \cdot p) < 1.2$$

wherein, for the three-dimensional printing powder, D is the D50 average size of the powder in microns and P is the true bulk density in grams/cm$^3$; and
    wherein, for the organic polymeric additive, d is the D50 average particle size in nanometers, p is the true bulk density is grams/cm$^3$, and w is the weight of the emulsion of organic polymeric additive added to the mixture in parts per hundred based on solids loading of the emulsion of organic polymeric additive in the emulsion of organic polymeric additive; and
    drying the mixture of the three-dimensional printing powder dispersion and the emulsion of organic polymeric additive to form a sinterable three-dimensional printing composition comprising the three-dimensional printing power and the organic polymeric additive.

2. The process of claim 1, wherein the three-dimensional printing powder was not previously dried.

3. The process of claim 1, wherein the optional dispersant is present; and
    wherein the dispersant is a surfactant comprising a member of the group consisting of an anionic surfactant, a cationic surfactant, a non-ionic surfactant, and combinations thereof.

4. The process of claim 1, wherein the emulsion of an organic polymeric additive comprises at least one non-cross-linkable polymerizable monomer; or
    wherein the organic polymeric additive comprises at least one cross-linkable polymerizable monomer; or
    wherein the organic polymeric additive comprises a combination of at least one non-cross-linkable polymerizable monomer and at least one cross-linkable polymerizable monomer.

5. The process of claim 1, wherein the organic polymeric additive comprises a cross-linkable monomer containing 2 or more vinyl groups; and
    wherein the cross-linkable monomer containing 2 or more vinyl groups is present in the organic polymeric additive in an amount of greater than zero up to about 40 percent, by weight, based on the total weight of the organic polymeric additive.

6. The process of claim 1, wherein the organic polymeric additive comprises an acidic monomer, a basic monomer, or a combination thereof.

7. The process of claim 1, wherein the organic polymeric additive comprises a basic monomer having a nitrogen-containing group; and
    wherein the basic monomer having a nitrogen-containing group is present in the organic polymeric additive in an amount of less than about 1.5 percent, by weight, based on the total weight of the organic polymeric additive.

8. The process of claim 1, wherein the organic polymeric additive comprises an acidic monomer having an acidic group selected from the group consisting of acrylic acid, beta-carboxyethyl acrylate, and combinations thereof; and
    wherein the acidic monomer is present in the organic polymeric additive in an amount of less than about 4 percent, by weight, based on the total weight of the organic polymeric additive.

9. The process of claim 1, wherein the organic polymeric additive comprises a monomer selected from the group consisting of an acrylate monomer, a methacrylate monomer, and combinations thereof.

10. The process of claim 1, wherein the composition comprises two or more organic polymeric additives;
    wherein a first organic polymeric additive has a first average D50 particle size;
    wherein a second organic polymeric additive has a second average D50 particle size; and
    wherein the first and second average D50 particle size differ by at least about 10 nanometers.

11. The process of claim 1, wherein the organic polymeric additive has a total surface loading of from about 0.01 to about 5 parts per hundred by weight based on the weight of the three-dimensional printing powder.

12. The process of claim 1, wherein the emulsion of organic polymeric additive comprises latex particles produced by emulsion polymerization of at least one monomer and a surfactant;

wherein the surfactant comprises a member of the group consisting of sodium dodecylbenzene sulfonate, sodium dodecyl sulphate, and combinations thereof.

13. A process comprising:

providing a three-dimensional printing powder dispersion comprising a three-dimensional printing powder, water, and optionally, a dispersing agent;

wherein the three-dimensional polymeric printing powder is selected from a member of the group consisting of polyamide 12 (PA12), polyamide 11 (PA11), polyamide 6 (PA6), polyamide 6,12 (PA6,12) low density polyethylene, high density polyethylene, polyhydroxybutyrate (PHB), polyhydroxyvalerate (PHV), polylactic acid (PLA), polyether ether ketone (PEEK),- polyether ketone ketone (PEKK); polyoxymethylene (POM); polymethyl methacrylate (PMMA), polystyrene (PS), high-impact polystyrene (HIPS), polyacrylates and polystyrene-acrylates; polyurethanes (PU), polyacrylonitrile-butadiene-styrene (ABS), polyvinyl alcohol (PVA), polydimethysiloxane (PDMS), polytetrafluoroethylene (PTFE), polyvinyl fluoride (PVF), polyvinylidene fluoride (PVDF), and combinations thereof;

providing an emulsion of an organic polymeric additive;

wherein the emulsion of organic polymeric additive comprises latex particles produced by emulsion polymerization of at least one monomer and a surfactant;

wherein the surfactant comprises a member of the group consisting of an anionic surfactant, a cationic surfactant, a non-ionic surfactant, and combinations thereof;

wherein the surfactant has a minimum surface tension of less than about 45 mN/m;

wherein the organic polymeric additive is a polymer or copolymer comprising a first monomer having a high carbon to oxygen ratio of from about 3 to about 8; optionally, a second monomer comprising two or more vinyl groups, wherein the second monomer, if present, is present in the copolymer in an amount of from greater than about 8 percent by weight to about 40 percent by weight, based on the weight of the copolymer; and optionally, a third monomer comprising an amine, wherein the third monomer, if present, is present in an amount of from about 0.1 percent by weight to about 1.5 percent by weight, based on the weight of the copolymer;

wherein the organic polymeric additive comprises latex particles having a volume average particle diameter of from about 20 nanometers to less than 50 nanometers;

combining the three-dimensional printing powder dispersion and the emulsion of organic polymeric additive to form a mixture comprising the three-dimensional printing powder dispersion and the emulsion of organic polymeric additive;

wherein the three-dimensional printing powder and the organic polymeric additive are combined to form the mixture according to the formula $$0.2 < (w \cdot D \cdot P)/(0.363 \cdot d \cdot p) < 1.2$$

wherein, for the three-dimensional printing powder, D is the D50 average size of the powder in microns and P is the true bulk density in grams/cm$^3$; and wherein, for the organic polymeric additive, d is the D50 average particle size in nanometers, p is the true bulk density is grams/cm$^3$, and w is the weight of the emulsion of organic polymeric additive added to the mixture in parts per hundred based on solids loading of the emulsion of organic polymeric additive in the emulsion of organic polymeric additive; and drying the mixture of the three-dimensional printing powder dispersion and the emulsion of organic polymeric additive to form a sinterable three-dimensional printing composition comprising the three-dimensional printing power and the organic polymeric additive.

14. The process of claim 1, further comprising:

employing the sinterable three-dimensional printing composition in a printing process;

wherein the printing process comprises exposing the sinterable three-dimensional printing composition to a laser to fuse the three-dimensional printing powder.

15. The process of claim 1, further comprising:

employing the sinterable three-dimensional printing composition in a printing process;

wherein the printing process comprises a selective laser sintering process.

16. The process of claim 1, wherein the first monomer of the organic polymeric additive is cyclohexyl methacrylate;

wherein the second monomer of the organic polymeric additive is divinyl benzene; and wherein the third monomer of the organic polymeric additive is dimethylaminoethyl methacrylate.

17. The process of claim 1, wherein the first monomer of the organic polymer additive is cyclohexyl methacrylate;

wherein the third monomer of the organic polymeric additive is dimethylaminoethyl methacrylate; and wherein the organic polymeric additive does not contain the second monomer.

18. The process of claim 1, wherein the first monomer of the organic polymer additive is cyclohexyl methacrylate;

wherein the second monomer of the organic polymeric additive is divinyl benzene; and wherein organic polymeric additive does not contain the third monomer comprising an amine.

* * * * *